US006768814B1

(12) United States Patent
Spitzer et al.

(10) Patent No.: US 6,768,814 B1
(45) Date of Patent: Jul. 27, 2004

(54) METHODS APPLYING COLOR MEASUREMENT BY MEANS OF AN ELECTRONIC IMAGING DEVICE

(75) Inventors: Daniel Spitzer, Leiden (NL); Marcel Petrus Lucassen, Amsterdam (NL)

(73) Assignee: Akzo Nobel N.V., Arnehm (NL)

( * ) Notice: Subject to any disclaimer, the term of this patent is extended or adjusted under 35 U.S.C. 154(b) by 562 days.

(21) Appl. No.: 09/680,089

(22) Filed: Oct. 5, 2000

(30) Foreign Application Priority Data

Oct. 5, 1999 (EP) .............................. 99203244

(51) Int. Cl.$^7$ ............................ G06K 9/00; H04N 1/46; G03F 3/08
(52) U.S. Cl. ...................... 382/162; 358/504; 358/523
(58) Field of Search ................................. 382/162, 165, 382/190, 206, 209, 218, 219; 345/418, 552, 549, 582, 589, 600, 604; 358/504, 515, 523, 530

(56) References Cited

U.S. PATENT DOCUMENTS

| | | | |
|---|---|---|---|
| 4,522,491 A | * 6/1985 | Ingalls et al. | 355/77 |
| 4,812,904 A | * 3/1989 | Maring et al. | 348/135 |
| 4,813,000 A | 3/1989 | Wyman et al. | 364/526 |
| 5,590,251 A | * 12/1996 | Takagi | 345/604 |
| 5,850,472 A | 12/1998 | Alston et al. | 382/162 |
| 6,186,403 B1 | * 2/2001 | Ozbey et al. | 235/487 |
| 6,519,038 B1 | * 2/2003 | Kritchman | 356/425 |
| 6,556,210 B1 | * 4/2003 | Yamamoto et al. | 345/582 |

OTHER PUBLICATIONS

H.R. Kang, Color Technology for Electronic Imaging Devices, SPIE Optical Engineering Press, 1997, Chapters 3.
H.R. Kang, Color Technology for Electronic Imaging Devices, SPIE Optical Engineering Press, 1997, Chapters 11.

* cited by examiner

*Primary Examiner*—Andrew W. Johns
*Assistant Examiner*—Amir Alavi
(74) *Attorney, Agent, or Firm*—Joan M. McGillycuddy

(57) ABSTRACT

The invention is a method of determining a color formula for matching a selected color, such that an electronic imaging device is calibrated, and at the same time or in a next step the selected color is measured with the aid of the electronic imaging device, then the measured color signals of the calibration colors are converted to the known calorimetric data and then the color signals of the measured selected color are converted to colorimetric data; and next, the color formula is determined that most closely matches the calculated colorimetric data of the measured selected color. The invention also determines a color formula for matching a selected color of textured materials; determines the color difference of a selected color compared to a standard color sample; and measures a specific attribute of the color appearance, the so-called texture.

19 Claims, 2 Drawing Sheets

Calibration pattern 1

Calibration pattern 1

Calibration pattern 2

METHODS APPLYING COLOR MEASUREMENT BY MEANS OF AN ELECTRONIC IMAGING DEVICE

Figure 1:
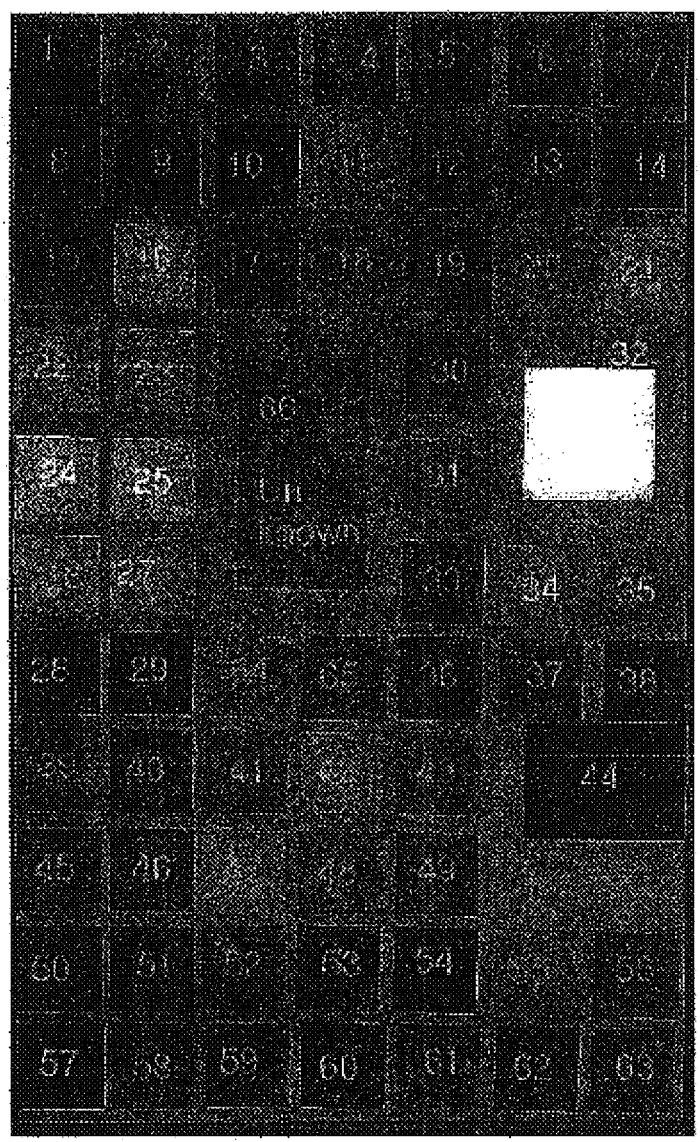

The invention pertains to methods applying color measurement by means of an electronic imaging device. More particularly, the invention pertains to a method of determining a color formula for matching a selected color measured with an electronic imaging device. The invention is also directed to a method of determining a color formula for matching a selected color of a textured material measured with an electronic imaging device. Finally, the invention is directed to a method for checking a selected color measured with an electronic imaging device with a standard color sample.

It is well-known to measure selected colors with the aid of color meters, such as spectrophotometers and tri-stimulus meters. The measured signals may be used for the determination of a color formula. Thus U.S. Pat. No. 4,813,000 discloses measuring a selected color with the aid of a tri-stimulus color analyser and using the measured chromaticity data to search for a color formula in a databank. A series of articles by W. R. Cramer published in *Fahrzeug+Karosserie*, 9, 1997, 11–12, 1997, and 1–5, 1998, describes commercial applications of measuring a selected color with the aid of a spectrophotometer and using the measured spectral data to search for a color formula in a databank. Such methods are especially suitable for use at points of sale where paints have to be available in every color.

It is also possible to use the measured signals to check the selected color with a standard color sample. Such a method is currently used in the printing inks industry.

The human eye is highly sensitive to color differences. If a color is to be matched, it is essential that the measurement of the color be as accurate as possible. High measuring accuracy requires calibration. To this end there are fixed standards defining color in terms of standard values, so-called calorimetric data. Most common calorimetric data has been laid down by the Commision International de l'Eclairage (CIE), e.g., CIELab ($L*_{ab}$, a*, b*), CIEXYZ (X, Y, Z), and CIELUV ($L*_{uv}$, u*, v*). Spectral measuring data and tri-stimulus measuring data therefore have to be converted to colorimetric data if a spectrophotometer or a tri-stimulus meter is to be calibrated.

The drawback to spectrophotometers is that they are very delicate instruments. Hence a certain expertise is required on the part of the user which is not always available at the aforementioned points of sale. Moreover, spectrophotometers are expensive. A further drawback to spectrophotometers and tri-stimulus meters is that they cannot be used for measuring color appearance including texture of the material.

The invention pertains to a method of determining a color formula for matching a selected color measured with an electronic imaging device, which method comprises the following steps:
  a) an electronic imaging device is calibrated by measuring the color signals of at least two calibration colors, the calorimetric data of each of the calibration colors being known;
  b) at the same time or in a next step the selected color is measured with the aid of the electronic imaging device;
  c) using a mathematical model, parameters are calculated for converting the measured color signals of the calibration colors to the known calorimetric data;
  d) using the mathematical model and the calculated parameters, the color signals of the measured selected color are converted to calorimetric data; and
  e) using a databank, the color formula is determined of which the colorimetric data most closely matches the calculated calorimetric data of the measured selected color.

The invention has the advantage that it is possible to make use of inexpensive consumer electronics. Consumer electronics often do not have the accurate settings required for specialist applications. The method according to the invention now makes it possible to utilise an inaccurate device for the determination of a color formula for matching a selected color and yet achieve a high level of measuring accuracy. In addition, the method can be performed easily by a non-specialist without him needing extensive training. The method according to the invention also makes it possible to measure a specific attribute of the color appearance, the so-called texture.

In the method according to the invention the term "electronic imaging device" stands for all devices with which an electronic image can be recorded that can be processed with the aid of a computer. Examples of such electronic imaging devices are digital recording devices. Preferably, the electronic imaging device is a digital video camera, a digital camera, a flatbed scanner, a drum scanner, or a manually operated scanner. However, an analogue video camera coupled to a so-called frame grabber which converts the analogue signal to a digital image is also covered by the term "electronic imaging device." Finally, the term "electronic imaging device" also covers multi-spectral-imaging equipment and monochrome cameras with multiple color filters. Examples of flatbed scanners are the Hewlett Packard 3C, Hewlett Packard Scanjet lec, Sharp JX450, Agfa Focus Color, and Afga Arcus Plus. Examples of drum scanners are the Howtek D4000, Optronics Color Getter, and LeafScan 45. Examples of digital cameras are the Ricoh RDC 5000, Olympus C-2000Z, and Nikon Coolpix 950. Preferably, a digital camera is employed.

A minimum of two calibration colors is used, i.e. white and black. Optionally, use may be made of grey or neutral colors. For a more accurate conversion of the color signals of the selected color to calorimetric data preference is given to including calibration colors other than the neutral colors. The calibration colors may be selected at random. Preferably, use is made of calibration colors distributed over the entire calorimetric color space. More preferably, use is made of calibration colors distributed in the vicinity of the selected color.

In theory, the physical calibration pattern can comprise as many calibration colors as may be present within the image field of the electronic imaging device. The calibration colors are recorded on the pattern in the form of patches. In theory, the calibration patches may have the size of a single pixel. In that case the size of the measuring surface will be equal to the size of the calibration patch. Depending on the electronic imaging device employed, phenomena may occur which require the calibration patch to be bigger than a single pixel. Such phenomena include stability, non-linearity, distortions, reproducibility of positioning, and cross-talk. Generally speaking, between 2 and 1000 calibration colors may be present, preferably 10–500, more preferably 25–150.

Of course, the calibration patches need not be square. Nor do they have to be rectangular or regularly shaped. There is no need to separate the colors, i.e. the color is allowed to shift gradually.

The support on which the calibration patches are provided may be flat or curved. Preferably, the support is of uniform color, e.g., white or grey. A clear space may be left around a portion or all of the calibration patches so as to leave the support's surface area visible. The uniform color of the support may also serve to measure and correct any spatial non-uniformity of the electronic imaging device.

Depending on the measuring accuracy required, it may be preferred to measure the calibration colors and the selected color simultaneously. In such cases the calibration pattern support may be provided with a recess, e.g., at the centre.

Alternatively, a support may be selected which is smaller than the image field, so that the remaining image field can be used to record the selected color.

Also, within the framework of the present invention it is possible to calibrate beforehand in step a) using a calibration pattern with more than 10 colors, then in step b) carry out a black and white calibration and measure the selected color simultaneously. This combination of steps is useful in reducing the variation in brightness due to the influence of the light source.

Processing the recorded image, calculating the model parameters, and converting the measured color signals to colorimetric data is all done by means of computer software. The software indicates the position of the calibration pattern and, optionally, the object to be measured. The software also includes a table listing known colorimetric data for each calibration color and a mathematical model describing the correlation between the measured color signals and the calorimetric data. With the aid of the software the model parameters are calculated from the mathematical model. The software then goes on to use the mathematical model and the model parameters to convert the measured signals of the selected color to calorimetric data.

Colorimetric data may be exemplified by CIE systems such as Lab or XYZ. However, this term is not restricted to CIE systems. It may be possible to use user defined systems.

The mathematical model selected may be any model known to the skilled person. Examples are mentioned in H. R. Kang, *Color Technology for Electronic Imaging Devices*, SPIE Optical Engineering Press, 1997, chapters 3 and 11, and in U.S. Pat. No. 5,850,472. The model may be non-linear or linear. One example of a non-linear model is a $2^{nd}$ order polynomial having 10 parameters or a $3^{rd}$ order polynomial having 20 parameters. Preferably, use is made of a linear model. More preferably, the linear model used has 4 model parameters.

One example of a linear model having 4 parameters is the following model, where the measured color signals of the calibration colors, in this case R, G, and B data, are converted to calorimetric data, in this case CIELab data:

$L_i^* = c_0 + c_1 R_i + c_2 G_i + c_3 B_i$, $a_i^* = d_0 + d_1 R_i + d_2 G_i + d_3 B_i$, $b_i^* = e_0 + e_1 R_i + e_2 G_i + e_3 B_i$, wherein $R_i$, $G_i$, $B_i$, $L_i^*$, $a_i^*$, and $b_i^*$ are the measured signals and the calorimetric data of calibration color i.

Linear regression is used to calculate the model parameters $c_0$–$c_3$, $d_0$–$d_3$, and $e_0$–$e_3$ from the measured RGB data and the known CIELab data of the calibration colors. These model parameters are used to convert the measured RGB data of the selected color to CIELab data.

One example of a non-linear $3^{rd}$ order polynomial having 20 parameters is:

$L_i^* = c_0 + c_1 R_i + c_2 G_i + c_3 B_i$ $+ c_4 R_i^2 + c_5 G_i^2 + c_6$ $B_i^2 - c_7 R_i G_i - c_8 R_i$ $B_i + c_9 G B_i 30\ c_{10} R_i^3$ $+ c_{11} G_i^3 + c_{12} B_i^3 + c_{13}$ $R_i^2 G_i + c_{14} R_i^2 B_i + c_{15}$ $G_i^2 R_i + c_{16} G_i^2 B_i +$ $c_{17} B_i^2 R_i + c_{18} B_i^2 G_i + c_{19} R_i G_i B_i$ $a_i^* = d_0 + d_1 R_i + d_2 G_i - d_3$ $B_i + d_4 R_i^2 + d_5 G_i^2 + d_6$ $B_i^2 - d_7 R_i G_i - d_8 R_i B_i + d_9 G_i$ $B_i + d_{10} R_i^3 + d_{11} G_i^3 + d_{12} B_i^3 + d_{13}$ $R_i^2 G_i + d_{14} R_i^2 B_i + d_{15} G_i^2$ $R_i + d_{16} G_i^2 B_i + d_{17} B_i^2 R_i + d_{18}$ $B_i^2 G_i + d_{19} R_i G_i B_i$ $b_i^* = e_0 + e_1 R_i + e_2 G_i - e_3$ $B_i + e_4 R_i^2 + e_5 G_i^2 + e_6$ $B_i^2 - e_7 R_i G_i - e_8 R_i B_i$ $+ e_9 G_i B_i + e_{10}$ $R_i^3 + e_{11} G_i^3 + e_{12} B_i^3$ $+ e_{13} R_i^2$ $G_i + e_{14} R_i^2 B_i + e_{15} G_i^2$ $R_i + e_{16} G_i^2 B_i + e_{17} B_i^2 R_i$ $+ e_{18}$ $B_i^2 G_i + e_{19} R_i G_i B_i$

Linear regression is used to calculate the model parameters $c_0$–$c_{19}$, $d_0$–$d_{19}$, and $e_0$–$e_{19}$ from the measured RGB data and the known CIELab data of the calibration colors. These model parameters are used to convert the measured RGB data of the selected color to CIELab data.

Notwithstanding the above, it is possible to lend greater weight to the calibration colors in the vicinity of the selected color when calculating the model parameters. In the case of the above example of a linear model having 4 parameters, this means that during the linear regression each calibration color is given a weighing factor based on the distance in the RGB color space between the calibration color in question and the selected color. In the linear regression procedure the following sum of squares is minimised:

$$\sum_{i=1}^{n} w_i (y_i - \hat{y}_i)^2$$

Written out, this sum is as follows:

$$\sum_{i=1}^{n} (L_i^* - c_0 - c_1 R_i - c_2 G_i - c_3 B_i)^2 ((R_i - R)^2 + (G_i - G)^2 + (B_i - B)^2)^{-2}$$

$$\sum_{i=1}^{n} (a_i^* - d_0 - d_1 R_i - d_2 G_i - d_3 B_i)^2 ((R_i - R)^2 + (G_i - G)^2 + (B_i - B)^2)^{-2}$$

$$\sum_{i=1}^{n} (b_i^* - e_0 - e_1 R_i - e_2 G_i - e_3 B_i)^2 ((R_i - R)^2 + (G_i - G)^2 + (B_i - B)^2)^{-2}$$

wherein n: is the number of calibration colors R, G, B: are the measured signals of the selected color Alternatively, it is possible to use the calibration colors in the vicinity of the selected color for interpolation.

If so desired, grey balancing may be performed on the signals measured for black, white, and grey according to the formula $R = G = B = f(L^*)$ or a comparable value for $L^*$ in a different colorimetric system. Such grey balancing is described in H. R. Kang, *Color Technology for Electronic*

*Imaging Devices*, SPIE Optical Engineering Press, 1997, chapter 11. Examples of algorithms suitable for use are:

$$R_{ig} = f_1 + f_2 \cdot L_{ig}^*$$

$$R_{ig} = f_1 + f_2 \cdot L_{ig}^* + f_3 \cdot (L_{ig}^*)^2$$

$$R_{ig} = f_1 + f_2 \cdot L_{ig}^* + f_3 \cdot \log(L_{ig}^*)$$

wherein $R_{ig}$ is the measured signal and $L_{ig}^*$ is the calorimetric value of the white, grey, and black calibration colors.

Alternatively, if so desired, an offset correction of the measured data for black and white may be performed according to the following formula:

$$R_c = ((R-R_b)/(R_w-R_b)) \times 255$$

$$G_c = ((G-G_b)/(G_w-G_b)) \times 255$$

$$B_c = ((B-B_b)/(B_w-B_b)) \times 255$$

wherein $R_c$, $G_c$, $B_c$=the corrected signals for the selected color

R, G, B=the measured signals for the selected color $R_w$, $G_w$, $B_w$=the measured signals for white $R_b$, $G_b$, $B_b$=the measured signals for black In the final step of the method according to the invention a databank is used to determine a color formula having colorimetric data most closely matching the calculated calorimetric data of the measured selected color. One measure of the color difference between the color formula and the selected color is, e.g., the following mathematical algorithm:

$$\Delta E^*_{ab} = \sqrt{((\Delta L^*)^2 + (\Delta a^*)^2 + (\Delta b^*)^2)}$$

wherein $\Delta E^*_{ab}$ is the color difference according to CIE $\Delta L^* = L^*_1 - L^*_2$ $\Delta a^* = a_1^* - a_2^*$ $\Delta b^* = b_1^* - b_2^*$ 1=the calculated colorimetric data of the selected color 2=the calorimetric data of the color formula from the databank The smaller the color difference $\Delta E_{ab}^*$ is, the better the match between the selected color and the color formula will be.

Color formulas can be determined in a number of ways, i.e. by means of search procedures, calculations, or combinations of the two. For example, use may be made of a databank comprising color formulas having colorimetric data linked thereto. Using the calculated calorimetric data of the measured selected color, the most closely matching color formula can be found. Alternatively, it is possible to use a databank having color formulas with spectral data linked thereto. Known calculation methods can be used to calculate the calorimetric data of the color formulas and compare them. Also, a databank can be used in which the absorption and reflection data, the so-called K and S data, of pigments are stored. Using K and S data in combination with pigment concentrations makes it possible to calculate the color formula of which the colorimetric data most closely match the colorimetric data of the measured selected color. The methods in question have been described in detail in D. B. Judd et al., *Color in Business, Science and Industry*. It is possible to combine the aforesaid search and calculation methods.

Phenomena such as light source metamerism, angular metamerism, and texture will affect the color matching.

Light source metamerism is a phenomenon where under a single light source, e.g., daylight, the observed colors of two objects may be the same visually, while under some other light source, e.g., fluorescent light, the colors differ. This can be taken into account by measuring under two light sources with different emission spectra. In the method according to the invention, advantageous use is made of an electronic imaging device, with recordings being made of the selected color and the calibration colors under different light sources. The software needed to process different measurements of the same object is known to the skilled person.

Textured materials, such as metallic and pearlescent paints, are characterised in that the appearance of the color changes as the angle of observation and/or exposure angle changes (angular metamerism). For proper measurement of such colors it is therefore essential to determine the color at at least two different angles. In this process it is advantageous to make use of the method according to the invention. An electronic imaging device makes it possible to measure the color of an object in any one of the following ways or combinations thereof:

At least two recordings are made with the electronic imaging device while the object moves within the image field of the device;

At least two recordings are made with the electronic imaging device while the device moves vis-à-vis the object;

At least two recordings are made with the electronic imaging device while a light source is moved vis-à-vis the object; or One recording is made with the electronic imaging device of a flat or curved section of the object when the device is able to discriminate in a single image between data at different angles.

The software required to process different measurements of the same object is known to the skilled person.

Another characteristic of materials, such as special effect paints, is texture. Texture can be defined as an arrangement of small areas having a specific color and/or shape. It was found that by using image processing methods known as such the texture of a special effect paint can be determined from recordings made with an electronic imaging device. One way of characterising texture is by means of texture parameters. Commercially available image processing packages, e.g., "Optimas," make it possible to calculate such texture parameters using the recording. An example of such calculations is given below. Needless to say, said example should not be construed as limiting the present invention in any way.

The recording of the measured selected color is used to determine the average brightness. Selected are areas in the recording which have much higher than average brightness. If so desired, it can be determined which areas overlap or adjoin and to separate those areas using software. Each selected area has its circumference and surface area calculated. This gives the average circumference, the average surface area, and the accompanying standard deviations for the measured selected color. Optionally, calculations such as averaging and filtering pixels and/or pixel groups may also be included.

If so desired, the texture measurement can be calibrated by applying one or more rulers to the calibration pattern.

For matching textured materials such as special effect paint, the method according to the invention provides the possibility of linking the color formulas in a databank not only to colorimetric data but also to texture parameters or recordings from which texture parameters can be calculated. Using these parameters or recordings the color formula most closely matching the selected color also in terms of texture can be found in the databank. One example of an algorithm for finding the most closely matching color formula which is also closest to the selected color in terms of texture is as follows:

$$\Delta T = \sqrt{w_1 \Delta T_1^2 + w_2 \Delta T_2^2 + \ldots + w_i \Delta T_i^2}$$

wherein $w_{1-i}$=weighing factors $T_{1-i}$=texture parameters

It is also possible to calculate an overall parameter, e.g. $\Delta Q = f(\Delta E, \Delta T)$.

The method according to the invention can be applied at points of sale which have to be able to supply paint in any color desired. A color formula is made up of quantities of mixing colors, master paints and/or pigment pastes. Using the color formula, the paint can be prepared in a dispenser. In the car repair sector it is customary to employ a set of mixing colors standardised for color and color strength. These standardised mixing colors, usually about 40 different colors, are present at the points of sale. From this set of standardised mixing colors any color of paint desired can be made. In the DIY sector as well as the professional painting industry it is customary to use a set of master paints standardised for color which often consists of at least one white and/or one clear master color, i.e. a paint without pigment, optionally supplemented with master paints in a number of different colors, and pigment pastes standardised for color and color strength. From this set of master paints any color desired can be made by adding pigment pastes to the master paint.

The present invention can be used with advantage in the car repair industry. In that case, the method may be carried out as follows. The color of a car to be repaired is measured using an electronic imaging device. Prior to this or at the same time, a recording is made of a panel on which different calibration colors have been applied. The colorimetric data of the car's color is calculated. Software is used to generate the color formula which after application will give a color identical to the color of the car to be repaired. The color formula is prepared in a dispenser and applied.

As stated above, it may be advantageous to perform the calibration colors measurement simultaneously with the measurement of the selected color. This is the case for instance in the car auto repair industry, where a measuring accuracy of a $\Delta E^*_{ab}$ smaller than 1 is required. In that case the method can be carried out such that in one image both a section of the car and the panel with the calibration colors are measured. The process does not require that the calibration panel is actually positioned on the car. It may be mounted somewhere else, providing it is in the same image field as the car during the recording.

Optionally, other information may be provided to be recorded with the electronic imaging device. For example, when several patterns are used, a code may be provided on every pattern. When the method of the invention is used in the car industry, information may be provided with regard to the type of car, its year of manufacturing, and other relevant information. This information may be provided in the form of bar codes, dot codes, or alpha-numerical information. A space may be provided on the calibration pattern for this kind of information. However, it is also possible to provide this information at any other place in the body shop as long as it is in the same image field as the car.

Since it has now proved possible to also measure the texture of an object with an electronic imaging device, the invention also comprises a method of determining a color formula for matching a selected color of textured materials such as special effect paints in which a) the selected color is measured with a spectrophotometer or tri-stimulus meter;

b) the texture of the selected color is measured with an electronic imaging device; and c) the measured color and texture signals are used to determine, in a databank, the color formula of which the calorimetric data and the texture parameters most closely match those of the selected color.

It is well-known to use a spectrophotometer for measuring a selected color of a special effect paint and use the spectral measuring data to find the color formula most closely matching the selected color in a databank. Such databanks often will have a texture parameter linked to the color formula, i.e. coarseness, frequently expressed in a numerical range, such as from 0 to 10. This parameter is indicated by the user, who with the aid of swatches will determine the coarseness of the special effect paint at sight. Using a method according to the invention, it is now possible to determine the texture electronically, convert it to a coarseness value, and use this value to find a color formula in an existing databank which most closely matches the selected color.

Alternatively, of course, databanks can be adapted or new ones set up in which new texture parameters or recordings are linked to color formulas.

Since special effect paints are used primarily on cars, the above methods are preferably used in the car repair industry.

Finally, the invention pertains also to a method of determining the color difference of a selected color measured with an electronic imaging device compared to a standard color sample, which method comprises the following steps:

a) an electronic imaging device is calibrated by measuring the color signals of at least two calibration colors, the calorimetric data of each of the calibration colors being known;

b) at the same time or in a next step the selected color is measured with the aid of the electronic imaging device;

c) using a mathematical model, parameters are calculated for converting the measured color signals of the calibration colors to the known colorimetric data;

d) using the mathematical model and the calculated parameters, the color signals of the measured selected color are converted to colorimetric data; and e) the calorimetric data of the selected color are compared to the calorimetric data of a standard color sample.

The calorimetric data of the standard color sample can be available in a software program. It is also possible to measure the standard color sample before, simultaneously, or after the measurement of the selected color. This method is preferably used in the printing inks industry.

All three methods of the present invention are not restricted to but are preferably used in the paint or printing inks industry.

The invention will be elucidated with reference to the following examples.

EXAMPLES

The measurements in these examples were performed using two different calibration patterns, both on an A4-size support. The calibration colors of the two calibration patterns first had their calorimetric data determined with the aid of spectrophotometers:

Calibration Pattern 1 (see FIG. 1):

65 calibration colors distributed over the entire color space

The colors are from the Sikkens 3031 Color Collection

The L*, a*, and b* data of the 65 calibration colors were measured with the HunterLab UltraScan spectrophotometer with D/8 geometry. The L*, a*, and b* (daylight D65, 10°-observer) data is listed in Table 1.

Figure 2:
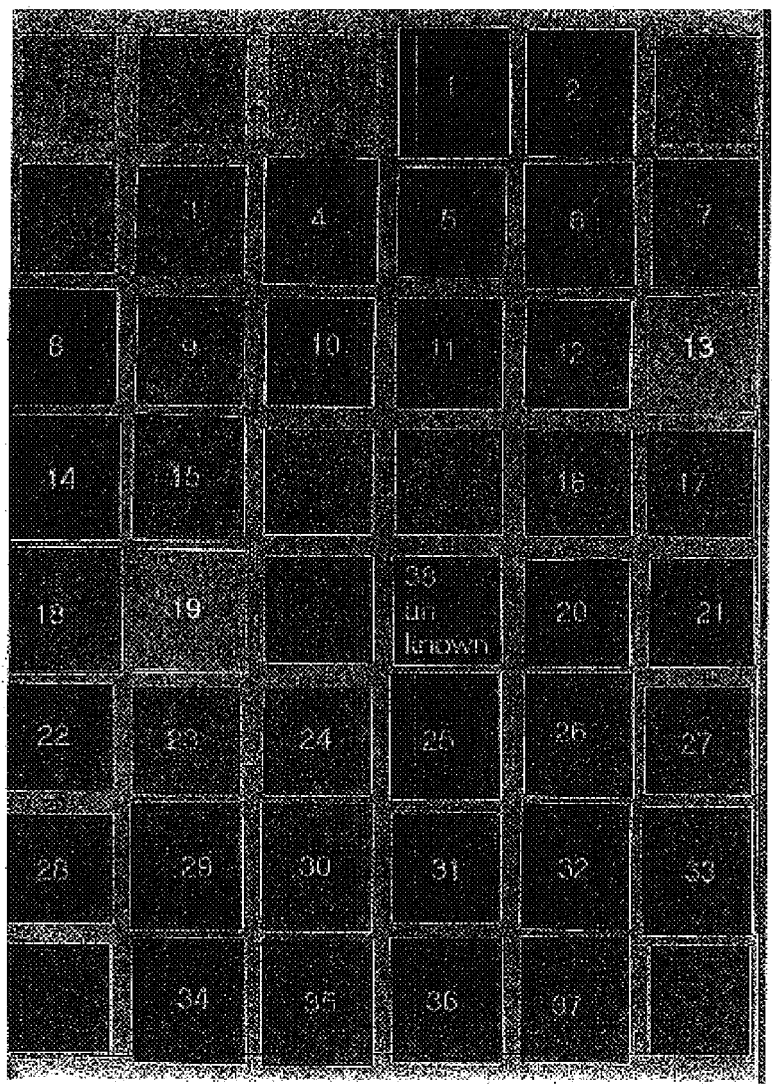

Calibration Pattern 2 (see FIG. 2):

37 calibration colors distributed over part of the color space ($0<a*<50$; $0<b*<50$; $15<L*<65$). The neutral colors (white/grey/black) are present in duplicate (color nos. 1, 2, 6, 7, 8, 13, 14, 15, 18, and 19).

The colors are selected from the Sikkens Car Refinishes Color Map (Autobase colors)

The 37 calibration colors were measured with different spectrophotometers, among others the Macbeth CE 730-GL, at three angles, 45/0, 45/20, and 45/–65 geometry. The spectral data was transformed mathematically to D/8 geometry. The calculated $L*$, $a*$, and $b*$ (scanner light source of the Hewlett Packard Scanjet 5P flatbed scanner, 10°-observer) data is listed in Table 2.

Example 1

A Hewlett Packard 3C flatbed scanner was used to measure the color of calibration pattern 1 and 149 unknown colors. The method involved each unknown color being measured simultaneously with the calibration pattern. The result of the measurements in other words was 149 color images of calibration pattern 1, each time with one of the 149 unknown colors in the position of the unknown color (see pattern 1, "unknown"). Using the linear model with 4 parameters and the weighing algorithm as described above, the calorimetric data of the 149 unknown colors was calculated.

In addition, the colorimetric data of the 149 unknown colors was measured with the aforesaid Hunterlab Ultrascan spectrophotometer with D/8 geometry (daylight D65, 10°-observer).

Table 3 presents a survey of the data. Columns 2–4 list the calorimetric data as measured with the spectrophotometer, columns 5–7 list the calorimetric data as measured using the scanner, and column 8 lists the color differences between the spectrophotometer and the scanner calorimetric data. On average, the color difference $\Delta E*_{ab}=2,26$. The median of the color difference $\Delta E*_{ab}=1,67$. The $\Delta E*_{ab}$'s are also listed in Table 4.

Example 2

Example 1 was repeated, except that the measurement of the calibration pattern took place beforehand. In other words, the outcome of the measurements was one recording of calibration pattern 1 and 149 recordings of the unknown colors without calibration pattern 1.

A survey of the results is also to be found in Table 3. Columns 9–11 list the calorimetric data as determined with the scanner. Column 12 lists the color difference between the colorimetric data determined with the spectrophotometer and those determined with the scanner. On average, the color difference $\Delta E*_{ab}=2,23$. The median of the color difference $\Delta E*_{ab}=1,61$. The $\Delta E*_{ab}$'s are also listed in Table 4.

Examples 3 and 4

Examples 1 and 2 were repeated, except that also grey balancing was performed using the following algorithm $R_{ig}=f_1+f_2 \cdot L_{ig}*$. The results are listed in Table 4.

Example 5

Example 1 was repeated, except that there was no weighing. The results are listed in Table 4.

Example 6

Example 5 was repeated, except that use was made of the model with 20 parameters as described in the text. The results are listed in Table 4.

Discussion of Examples 1–6

As is clear from Table 4, Examples 1–6 show that good results can be obtained using the method according to the invention. Depending on the required accuracy, it is possible to choose among the different algorithms. It is clear from Examples 5 and 6 that a method according to the invention can be performed by simultaneously calibrating and employing a model with 4 or 20 parameters. Also, it is shown in Examples 1–2 and 3–4 that there is hardly any difference between calibrating beforehand and simultaneous calibration. This is probably the result of a combination of factors, i.e. the use of the calibration pattern with 65 colors, the mathematical model, and the Hewlett Packard 3C flatbed scanner. It is expected that a change of one or more of these factors will show better results in the simultaneous calibration than in calibrating beforehand.

Example 7

Using a Hewlett Packard Scanjet 5P flatbed scanner, the color was measured of calibration pattern 2 and 28 unknown colors, in each case with the unknown color being measured simultaneously with the calibration pattern. The result of the measurements thus was 28 color images of calibration pattern 2, each time with one of the 28 unknown colors in the position of the unknown color (see pattern 2, "unknown"). Using the linear model with 4 parameters and the weighing algorithm as described in the text above, the calorimetric data of the 28 unknown colors was calculated.

In addition, the colorimetric data of the 28 unknown colors was calculated by measuring the colors with the aid of a MacBeth CE 730-GL spectrophotometer, at three angles, 45/0, 45/20, and 45/–65 geometry (scanner light source of the Hewlett Packard Scanjet 5P flatbed scanner, 10°-observer) and transforming the spectral data mathematically to D/8 geometry.

Table 5 presents a survey of the measuring data. Columns 2–4 list the calorimetric data as measured with the spectrophotometer, columns 5–7 list the colorimetric data as measured with the scanner, and column 8 lists the color differences between the spectrophotometer and the scanner colorimetric data. On average, the color difference $\Delta E*_{ab}=2,20$. The median of the color difference $\Delta E*_{ab}=2,04$. The $\Delta E*_{ab}$'s are also listed in Table 6.

Example 8

Example 7 was repeated, except that the measurement of the calibration pattern took place beforehand. The outcome of the measurements, in other words, was one recording of calibration pattern 2 and 28 recordings of the unknown colors without calibration pattern 2.

A survey of the results is also to be found in Table 5. Columns 9–11 list the colorimetric data as determined with the scanner. Column 12 lists the color difference between the colorimetric data determined with the spectrophotometer and those determined with the scanner. On average, the color difference $\Delta E*_{ab}=2,24$. The median of the color difference $\Delta E*_{ab}=2,18$. The $\Delta E*_{ab}$'s are also listed in Table 6.

Examples 9 and 10

Examples 7 and 8 were repeated, except that also grey balancing was performed using the following algorithm $R_{ig}=f_1+f_2 \cdot L_{ig}*$. The $\Delta E*_{ab}$'s are listed in Table 6.

Example 11

Example 7 was repeated, except that there was no weighing. The $\Delta E*_{ab}$'s are listed in Table 6.

Example 12

Example 11 was repeated, except that use was made of the model with 20 parameters as described in the text. The $\Delta E*_{ab}$'s are listed in Table 6.

Discussion of Examples 7–12

As is clear from Table 6, Examples 7–12 show that good results can be obtained using the method according to the invention. Depending on the required accuracy, it is possible to choose among the different algorithms. It is clear from Examples 11 and 12 that a method according to the invention can be performed by simultaneously calibrating and employing a model with 4 or 20 parameters. Also, it is shown in Examples 7–8 and 9–10 that there is hardly any difference between calibrating beforehand and simultaneous calibration. This is probably the result of a combination of factors, i.e. the use of the calibration pattern with 37 colors, the mathematical model, and the Hewlett Packard Scanjet 5P flatbed scanner. It is expected that a change of one or more of these factors will show better results in the simultaneous calibration than in calibrating beforehand.

Example 13: Reproducibility

One of the 65 calibration patches of pattern 1 (no. 8) was designated as an unknown color. The colorimetric data of the selected color was L*=36,56; a*=56,40; and b*=42,10.

Calibration patch 8 was measured 149 times with the Hewlett Packard 3C flatbed scanner, simultaneously with the 64 known calibration colors. The standard deviation in $\Delta E^*_{ab}$ measured over the 149 measuring points was 0,35, which is comparable with the result for a spectrophotometer.

Example 14: Reproducibility

On eof the 37 calibration patches of pattern 2 (no. 26) was designated as an unknown color. The colorimetric data of the selected color was L*=34,29; a*=37,55; and b*=33,64.

Calibration patch 26 was measured 28 times with the Hewlett Packard 3C flatbed colors scanner, simultaneously with the 36 known calibration patches. The standard deviation of $\Delta E^*_{ab}$ measured over the 28 measuring points was 0,17, which is of the same order of magnitude as when a spectrophotometer is used.

TABLE 1

Colorimetric data of calibration pattern 1 measured with the Hunterlab spectrophotometer (daylight D65, 10°-observer)

| Calibration patch | Measured data (CIE) | | |
|---|---|---|---|
| | L* | a* | b* |
| 1 | 23.67 | 31.31 | 10.69 |
| 2 | 56.60 | 34.49 | 13.98 |
| 3 | 50.48 | 46.72 | 18.74 |
| 4 | 46.72 | 53.20 | 23.01 |
| 5 | 18.33 | 13.52 | 8.22 |
| 6 | 39.86 | 43.11 | 30.76 |
| 7 | 34.44 | 46.89 | 35.06 |
| 8 | 36.56 | 56.40 | 42.10 |
| 9 | 39.04 | 57.47 | 45.18 |
| 10 | 35.57 | 32.99 | 31.27 |
| 11 | 75.67 | 20.82 | 29.39 |
| 12 | 57.50 | 43.64 | 62.68 |
| 13 | 45.90 | 18.78 | 39.32 |
| 14 | 33.76 | 7.97 | 17.87 |
| 15 | 70.84 | 31.22 | 92.17 |
| 16 | 89.07 | 5.42 | 21.46 |
| 17 | 46.29 | 9.96 | 46.57 |
| 18 | 68.95 | 16.82 | 80.15 |
| 19 | 40.73 | 3.70 | 21.99 |
| 20 | 75.78 | 11.24 | 91.04 |
| 21 | 85.14 | 3.28 | 57.41 |
| 22 | 87.63 | 8.71 | 2.00 |
| 23 | 84.96 | 7.26 | 12.81 |
| 24 | 90.59 | 0.42 | 6.25 |
| 25 | 89.13 | -1.27 | 1.02 |

TABLE 1-continued

Colorimetric data of calibration pattern 1 measured with the Hunterlab spectrophotometer (daylight D65, 10°-observer)

| Calibration patch | Measured data (CIE) | | |
|---|---|---|---|
| | L* | a* | b* |
| 26 | 88.89 | -7.82 | -1.62 |
| 27 | 85.73 | 1.84 | -8.11 |
| 28 | 29.52 | 6.54 | 0.72 |
| 29 | 21.56 | 2.52 | 4.84 |
| 30 | 36.55 | 0.89 | 7.92 |
| 31 | 60.78 | -3.08 | 6.28 |
| 32 | 95.23 | -0.91 | 0.93 |
| 33 | 24.68 | -6.48 | 1.02 |
| 34 | 80.28 | -0.13 | 0.06 |
| 35 | 60.92 | -0.20 | 0.27 |
| 36 | 23.45 | -0.45 | -0.73 |
| 37 | 30.50 | 0.26 | -0.01 |
| 38 | 16.97 | 0.31 | 1.37 |
| 39 | 64.60 | 1.22 | 67.45 |
| 40 | 27.26 | -4.14 | 20.17 |
| 41 | 54.33 | -14.23 | 51.54 |
| 42 | 85.41 | -14.22 | 26.69 |
| 43 | 60.75 | -12.09 | 15.68 |
| 44 | 12.02 | -0.39 | -0.62 |
| 45 | 48.45 | -24.08 | 29.04 |
| 46 | 27.35 | -8.37 | 8.95 |
| 47 | 79.80 | -12.99 | 14.65 |
| 48 | 63.89 | -41.61 | 38.05 |
| 49 | 35.93 | -13.81 | 8.00 |
| 50 | 40.96 | -34.26 | 11.19 |
| 51 | 35.75 | -38.78 | 0.48 |
| 52 | 55.84 | -19.84 | -5.48 |
| 53 | 26.09 | -9.59 | -5.56 |
| 54 | 18.92 | -8.61 | -8.01 |
| 55 | 74.36 | -14.83 | -15.11 |
| 56 | 46.17 | -29.05 | -25.64 |
| 57 | 15.61 | -6.47 | -10.57 |
| 58 | 57.39 | -10.71 | -17.84 |
| 59 | 35.59 | -12.07 | -29.64 |
| 60 | 34.45 | -12.38 | -37.92 |
| 61 | 43.42 | 4.46 | -22.82 |
| 62 | 34.21 | -0.57 | -34.86 |
| 63 | 46.34 | 7.69 | -32.94 |
| 64 | 65.16 | 15.14 | -7.60 |
| 65 | 43.99 | 22.89 | -14.27 |

TABLE 2

Colorimetric data of calibration pattern 2 measured with a spectrophotometer (scanner light source of the Hewlett Packard Scanjet 5P flatbed scanner, 10°-observer)

| Calibration patch | Measured data (CIE) | | |
|---|---|---|---|
| | L* | a* | b* |
| 1 | 17.00 | -0.07 | -0.34 |
| 2 | 26.13 | -0.04 | -0.20 |
| 3 | 59.55 | 6.39 | 43.02 |
| 4 | 44.03 | 7.81 | 44.48 |
| 5 | 40.03 | 8.02 | 27.87 |
| 6 | 62.52 | -0.50 | -0.25 |
| 7 | 42.18 | 0.09 | -0.21 |
| 8 | 17.00 | -0.07 | -0.34 |
| 9 | 59.01 | 9.63 | 26.03 |
| 10 | 29.16 | 8.09 | 21.43 |
| 11 | 38.01 | 30.08 | 35.37 |
| 12 | 39.96 | 8.00 | 35.05 |
| 13 | 87.99 | -0.35 | -0.08 |
| 14 | 26.13 | -0.04 | -0.20 |
| 15 | 42.18 | 0.09 | -0.21 |
| 16 | 57.48 | 20.93 | 39.01 |
| 17 | 45.24 | 22.82 | 39.82 |
| 18 | 62.52 | -0.50 | -0.25 |

TABLE 2-continued

Colorimetric data of calibration pattern 2 measured with a spectrophotometer (scanner light source of the Hewlett Packard Scanjet 5P flatbed scanner, 10°-observer)

| Calibration patch | Measured data (CIE) | | |
|---|---|---|---|
| | L* | a* | b* |
| 19 | 87.99 | −0.35 | −0.08 |
| 20 | 28.77 | 21.89 | 23.23 |
| 21 | 39.85 | 41.15 | 41.44 |
| 22 | 39.16 | 25.28 | 24.48 |
| 23 | 61.21 | 22.30 | 22.38 |
| 24 | 59.28 | 42.37 | 39.71 |
| 25 | 24.05 | 7.78 | 9.13 |
| 26 | 34.29 | 37.55 | 33.64 |
| 27 | 44.14 | 42.56 | 26.06 |
| 28 | 54.09 | 42.16 | 25.65 |
| 29 | 40.45 | 9.54 | 6.44 |
| 30 | 58.95 | 8.08 | 7.83 |
| 31 | 28.76 | 43.21 | 23.63 |
| 32 | 22.42 | 24.71 | 9.62 |
| 33 | 40.61 | 27.92 | 9.67 |
| 34 | 25.48 | 39.71 | 9.94 |
| 35 | 56.69 | 26.87 | 6.45 |
| 36 | 43.08 | 40.55 | 4.95 |
| 37 | 57.23 | 41.44 | 7.64 |

TABLE 3

Measuring data of Examples 1 and 2

| Color | Colorimetric data measured with a spectrophotometer | | | Simultaneous measuring and calibration | | | $\Delta E^*_{ab}$-real | Calibration precedes measuring | | | $\Delta E^*_{ab}$-sing |
|---|---|---|---|---|---|---|---|---|---|---|---|
| | L*-ref | a*-ref | b*-ref | L*-real | a*-real | b*-real | | L*-sing | a*-sing | b*-sing | |
| 1 | 49.71 | 6.26 | 0.11 | 50.63 | 6.92 | 0.86 | 1.36 | 50.63 | 6.92 | 0.86 | 1.36 |
| 2 | 13.27 | 5.73 | 2.18 | 15.40 | 3.76 | 3.42 | 3.15 | 15.19 | 3.74 | 3.32 | 2.99 |
| 3 | 12.29 | 17.25 | 2.74 | 17.00 | 18.13 | 8.93 | 7.82 | 15.82 | 17.62 | 7.81 | 6.19 |
| 4 | 75.11 | 8 | 3.69 | 75.84 | 8.14 | 4.54 | 1.13 | 75.70 | 7.90 | 4.81 | 1.27 |
| 5 | 43.97 | 51.03 | 15.41 | 43.88 | 51.53 | 13.73 | 1.75 | 43.23 | 50.34 | 12.91 | 2.70 |
| 6 | 17.4 | 24.77 | 10.24 | 21.85 | 30.74 | 19.46 | 11.85 | 21.35 | 29.57 | 18.16 | 10.07 |
| 7 | 25.19 | 42.36 | 21.41 | 29.51 | 43.82 | 30.29 | 9.99 | 28.22 | 42.74 | 28.54 | 7.75 |
| 8 | 21.8 | 2.56 | 1.53 | 21.47 | 3.12 | 4.07 | 2.62 | 21.19 | 3.35 | 4.51 | 3.14 |
| 9 | 15.25 | 15.84 | 7.62 | 17.29 | 13.49 | 9.31 | 3.54 | 16.45 | 12.63 | 7.73 | 3.43 |
| 10 | 34.81 | 48.8 | 29.69 | 36.16 | 49.38 | 33.94 | 4.50 | 36.27 | 48.40 | 32.83 | 3.49 |
| 11 | 28.71 | 49.11 | 30.31 | 32.81 | 49.99 | 37.88 | 8.65 | 31.85 | 48.86 | 35.69 | 6.23 |
| 12 | 22.61 | 27.71 | 19.84 | 22.38 | 26.01 | 19.17 | 1.84 | 21.21 | 25.84 | 17.42 | 3.36 |
| 13 | 28.01 | 32.31 | 23.89 | 26.97 | 31.06 | 23.97 | 1.63 | 26.25 | 29.93 | 22.82 | 3.15 |
| 14 | 33.22 | 50.72 | 37 | 33.93 | 51.63 | 39.50 | 2.75 | 33.00 | 50.40 | 37.51 | 0.64 |
| 15 | 82.74 | 3.55 | 3.88 | 83.33 | 4.56 | 5.40 | 1.92 | 82.89 | 4.56 | 5.76 | 2.14 |
| 16 | 60.42 | 24.02 | 22.39 | 59.17 | 25.76 | 19.18 | 3.86 | 58.93 | 24.67 | 18.77 | 3.97 |
| 17 | 45.95 | 24.87 | 24.61 | 46.37 | 24.88 | 27.82 | 3.24 | 45.88 | 23.54 | 26.66 | 2.44 |
| 18 | 43.89 | 40.09 | 38.78 | 48.04 | 40.80 | 51.49 | 13.39 | 47.48 | 39.41 | 50.14 | 11.93 |
| 19 | 92.39 | 1.06 | 3.49 | 93.71 | 0.91 | 2.93 | 1.44 | 92.99 | 1.08 | 3.31 | 0.62 |
| 20 | 89.56 | 4.09 | 6.44 | 89.97 | 4.39 | 6.68 | 0.56 | 89.66 | 3.98 | 6.58 | 0.21 |
| 21 | 86.08 | 6.9 | 7.99 | 86.57 | 7.62 | 9.67 | 1.90 | 86.23 | 7.17 | 9.54 | 1.58 |
| 22 | 22.57 | 4.8 | 6.06 | 22.31 | 4.82 | 7.16 | 1.14 | 22.26 | 4.76 | 6.96 | 0.95 |
| 23 | 45.1 | 7.29 | 7.86 | 45.77 | 7.06 | 6.39 | 1.63 | 45.43 | 6.42 | 6.48 | 1.67 |
| 24 | 75.62 | 11.53 | 12.94 | 75.48 | 11.59 | 12.55 | 0.42 | 75.12 | 10.78 | 12.20 | 1.17 |
| 25 | 20.1 | 10.87 | 10.38 | 21.58 | 11.03 | 11.66 | 1.96 | 20.87 | 10.12 | 10.39 | 1.08 |
| 26 | 54 | 22.28 | 26.15 | 55.73 | 22.25 | 28.69 | 3.07 | 55.44 | 20.63 | 27.75 | 2.72 |
| 27 | 27.56 | 15.78 | 18.83 | 29.02 | 14.97 | 21.38 | 3.05 | 28.33 | 14.92 | 20.43 | 1.98 |
| 28 | 71.6 | 4.45 | 6.08 | 71.62 | 4.10 | 5.75 | 0.48 | 71.15 | 3.60 | 5.88 | 0.98 |
| 29 | 88.36 | 5.09 | 7.67 | 88.92 | 5.33 | 9.50 | 1.93 | 88.52 | 5.08 | 9.14 | 1.48 |
| 30 | 66.31 | 8.14 | 11.37 | 66.53 | 7.89 | 11.49 | 0.35 | 66.26 | 7.04 | 11.45 | 1.10 |
| 31 | 80.62 | 12.48 | 16.75 | 80.91 | 12.77 | 17.68 | 1.02 | 80.77 | 11.85 | 17.29 | 0.84 |
| 32 | 8.42 | 0.57 | −0.11 | 13.47 | −0.12 | 0.05 | 5.10 | 12.91 | 0.16 | −0.24 | 4.51 |
| 33 | 52.34 | 2.7 | 5.87 | 53.51 | 2.96 | 6.10 | 1.23 | 53.31 | 2.18 | 6.31 | 1.19 |
| 34 | 34.61 | 6.16 | 11.87 | 35.29 | 6.25 | 14.68 | 2.89 | 35.26 | 5.53 | 14.81 | 3.08 |
| 35 | 27.7 | 13.56 | 22.8 | 29.83 | 13.66 | 24.38 | 2.65 | 29.47 | 13.08 | 23.47 | 1.95 |
| 36 | 56.51 | 9.55 | 21.34 | 56.69 | 9.46 | 19.03 | 2.32 | 56.61 | 9.41 | 18.95 | 2.40 |
| 37 | 25.48 | 1.29 | 4.75 | 24.42 | 1.29 | 5.55 | 1.33 | 24.28 | 0.82 | 6.06 | 1.84 |

TABLE 3-continued

Measuring data of Examples 1 and 2

| Color | Colorimetric data measured with a spectrophotometer | | | Simultaneous measuring and calibration | | | ΔE*$_{ab}$-real | Calibration precedes measuring | | | ΔE*$_{ab}$-sing |
|---|---|---|---|---|---|---|---|---|---|---|---|
| | L*-ref | a*-ref | b*-ref | L*-real | a*-real | b*-real | | L*-sing | a*-sing | b*-sing | |
| 38 | 80.87 | 4.88 | 14.71 | 81.05 | 5.35 | 15.48 | 0.92 | 80.71 | 5.04 | 15.45 | 0.77 |
| 39 | 64.96 | 8.09 | 23.33 | 65.17 | 8.23 | 22.80 | 0.58 | 65.05 | 7.65 | 22.88 | 0.64 |
| 40 | 70.72 | 13.31 | 42.15 | 70.81 | 12.61 | 41.30 | 1.10 | 70.78 | 11.54 | 40.89 | 2.17 |
| 41 | 51.9 | 18.98 | 54.91 | 53.83 | 18.12 | 62.24 | 7.63 | 53.87 | 17.18 | 62.55 | 8.09 |
| 42 | 65.68 | 2.34 | 9.17 | 66.02 | 2.31 | 9.82 | 0.73 | 65.89 | 1.95 | 10.19 | 1.11 |
| 43 | 52.47 | 2.46 | 9.1 | 52.56 | 2.64 | 7.81 | 1.30 | 52.82 | 1.95 | 8.09 | 1.19 |
| 44 | 89.61 | 4.12 | 14.61 | 90.63 | 4.20 | 17.04 | 2.63 | 90.35 | 3.87 | 16.42 | 1.98 |
| 45 | 84.56 | 7.7 | 26.01 | 84.59 | 7.69 | 26.57 | 0.56 | 84.36 | 7.03 | 25.77 | 0.74 |
| 46 | 89.79 | 0.81 | 5.19 | 90.27 | 0.74 | 5.92 | 0.87 | 89.78 | 0.97 | 5.96 | 0.79 |
| 47 | 76.67 | 1.44 | 9.09 | 77.02 | 1.49 | 9.27 | 0.40 | 76.42 | 1.33 | 9.33 | 0.36 |
| 48 | 45.51 | 1.92 | 9.69 | 46.29 | 2.17 | 8.23 | 1.67 | 45.81 | 1.51 | 8.62 | 1.19 |
| 49 | 81.64 | 4.39 | 21.07 | 82.05 | 4.51 | 21.75 | 0.80 | 81.61 | 4.15 | 21.33 | 0.35 |
| 50 | 81.88 | 1.99 | 11.52 | 82.04 | 1.83 | 11.48 | 0.23 | 81.44 | 1.68 | 11.41 | 0.55 |
| 51 | 70.97 | 1.77 | 18.31 | 71.40 | 1.77 | 18.76 | 0.62 | 71.19 | 1.20 | 18.94 | 0.87 |
| 52 | 80.28 | 2.62 | 20.73 | 80.64 | 2.57 | 21.40 | 0.76 | 80.10 | 2.34 | 21.11 | 0.51 |
| 53 | 85.34 | 2.93 | 22.93 | 85.92 | 2.59 | 24.07 | 1.32 | 85.68 | 2.11 | 23.30 | 0.97 |
| 54 | 65.59 | 5.37 | 49.99 | 66.54 | 5.22 | 55.36 | 5.45 | 66.52 | 4.23 | 55.48 | 5.69 |
| 55 | 54.62 | 7.61 | 54.69 | 52.93 | 8.17 | 59.01 | 4.67 | 53.21 | 6.95 | 59.06 | 4.64 |
| 56 | 70.45 | 1.02 | 42.48 | 71.84 | 1.05 | 43.87 | 1.97 | 71.84 | 0.07 | 43.51 | 1.98 |
| 57 | 89.88 | 0.18 | 9.66 | 90.55 | −0.04 | 10.52 | 1.11 | 90.15 | 0.15 | 10.16 | 0.57 |
| 58 | 88.51 | 0.77 | 13.07 | 89.11 | 0.70 | 14.58 | 1.63 | 88.63 | 0.59 | 13.95 | 0.91 |
| 59 | 77.02 | −0.37 | 14.1 | 77.40 | −0.19 | 14.30 | 0.46 | 76.71 | −0.51 | 14.13 | 0.34 |
| 60 | 46.16 | −0.62 | 20.09 | 46.11 | −0.19 | 19.42 | 0.80 | 45.81 | −0.92 | 19.70 | 0.60 |
| 61 | 78.14 | −1.25 | 30.03 | 79.29 | −1.13 | 31.39 | 1.78 | 78.76 | −1.52 | 30.90 | 1.10 |
| 62 | 92.66 | −0.15 | 8.14 | 94.21 | −0.12 | 8.50 | 1.59 | 93.93 | 0.12 | 8.62 | 1.38 |
| 63 | 85.33 | −0.16 | 10.42 | 85.99 | −0.05 | 11.57 | 1.33 | 85.65 | −0.12 | 11.68 | 1.30 |
| 64 | 66.7 | −1.31 | 11.69 | 66.72 | −1.12 | 12.70 | 1.03 | 66.81 | −1.49 | 13.05 | 1.37 |
| 65 | 55.97 | −1.72 | 9.92 | 56.88 | −1.59 | 9.68 | 0.95 | 56.67 | −2.35 | 10.19 | 0.98 |
| 66 | 45.98 | −6.41 | 28.68 | 45.07 | −5.61 | 27.82 | 1.48 | 45.32 | −6.51 | 29.05 | 0.77 |
| 67 | 87.22 | −1.25 | 4.43 | 87.59 | −1.36 | 4.86 | 0.58 | 87.10 | −1.28 | 4.92 | 0.51 |
| 68 | 52.72 | −1.9 | 5.23 | 53.73 | −1.43 | 5.22 | 1.11 | 53.32 | −2.10 | 5.69 | 0.78 |
| 69 | 71.08 | −1.71 | 5.96 | 71.36 | −1.46 | 5.91 | 0.38 | 70.86 | −1.95 | 6.30 | 0.47 |
| 70 | 30.92 | −2.65 | 8.69 | 30.90 | −3.12 | 9.87 | 1.27 | 30.76 | −3.57 | 9.93 | 1.55 |
| 71 | 35.23 | −7.34 | 28.35 | 36.88 | −8.86 | 30.92 | 3.41 | 36.96 | −9.49 | 31.81 | 4.42 |
| 72 | 55.65 | −5.3 | 9.65 | 56.01 | −5.30 | 8.96 | 0.78 | 55.73 | −5.89 | 9.53 | 0.61 |
| 73 | 66.67 | −5.66 | 9.97 | 66.01 | −5.67 | 10.96 | 1.19 | 66.06 | −6.09 | 11.48 | 1.68 |
| 74 | 75.32 | −6.33 | 11.78 | 74.95 | −5.62 | 10.93 | 1.17 | 74.20 | −5.61 | 11.10 | 1.49 |
| 75 | 85.09 | −7.32 | 12.63 | 85.21 | −7.00 | 12.84 | 0.40 | 84.45 | −6.65 | 13.03 | 1.01 |
| 76 | 35.1 | −7.84 | 15.88 | 34.77 | −9.59 | 16.72 | 1.97 | 34.65 | −10.40 | 17.03 | 2.84 |
| 77 | 83.16 | −4.27 | 6.37 | 84.00 | −4.35 | 7.25 | 1.22 | 83.26 | −4.15 | 7.53 | 1.17 |
| 78 | 57.75 | −4.28 | 6.42 | 58.14 | −3.93 | 6.13 | 0.60 | 57.86 | −4.41 | 6.64 | 0.28 |
| 79 | 43.77 | −2.11 | 2.4 | 44.83 | −0.79 | 2.25 | 1.70 | 43.86 | −1.77 | 2.16 | 0.43 |
| 80 | 62.94 | −17.03 | 21.53 | 62.46 | −17.78 | 18.89 | 2.78 | 61.96 | −18.20 | 19.95 | 2.20 |
| 81 | 92.95 | −1.12 | 1.25 | 95.73 | 0.68 | 1.26 | 2.82 | 94.11 | −0.53 | 1.94 | 1.47 |
| 82 | 85.51 | −10.69 | 10.42 | 86.08 | −10.21 | 11.20 | 1.07 | 85.06 | −9.66 | 11.58 | 1.62 |
| 83 | 71.5 | −13.48 | 12.33 | 70.53 | −13.50 | 10.96 | 1.68 | 69.83 | −13.62 | 11.40 | 1.92 |
| 84 | 48.62 | −15.07 | 12.12 | 48.97 | −13.92 | 8.73 | 3.59 | 48.42 | −14.40 | 9.43 | 2.78 |
| 85 | 40.29 | −19.75 | 15.51 | 39.53 | −21.46 | 16.39 | 2.07 | 39.63 | −21.59 | 17.19 | 2.58 |
| 86 | 36.69 | −31.82 | 23.66 | 36.32 | −36.81 | 23.26 | 5.02 | 36.05 | −36.72 | 24.58 | 5.03 |
| 87 | 46.08 | −2.07 | 1 | 47.04 | −1.10 | 0.13 | 1.61 | 46.37 | −1.81 | 0.36 | 0.75 |
| 88 | 92.14 | −4.27 | 3.62 | 93.42 | −3.80 | 3.86 | 1.38 | 92.36 | −3.44 | 3.99 | 0.93 |
| 89 | 64.1 | −9.61 | 6.11 | 63.08 | −9.95 | 6.58 | 1.17 | 62.78 | −10.46 | 6.86 | 1.74 |
| 90 | 77.38 | −11.04 | 7.27 | 76.38 | −9.96 | 6.19 | 1.83 | 76.10 | −9.60 | 6.46 | 2.09 |
| 91 | 84.65 | −13.66 | 8.73 | 84.28 | −13.15 | 8.43 | 0.70 | 84.55 | −13.32 | 8.46 | 0.44 |
| 92 | 20.03 | −13.51 | 6.95 | 21.05 | −10.84 | 6.42 | 2.91 | 20.82 | −11.13 | 6.60 | 2.53 |
| 93 | 16.47 | −5.88 | 3.55 | 17.88 | −4.26 | 3.74 | 2.15 | 17.66 | −4.44 | 3.93 | 1.91 |
| 94 | 80.15 | −7.24 | 3.29 | 80.35 | −6.80 | 3.18 | 0.50 | 80.13 | −6.37 | 3.79 | 1.01 |
| 95 | 25.92 | −26.75 | 8.14 | 27.34 | −23.30 | 10.41 | 4.37 | 26.58 | −23.45 | 11.21 | 4.56 |
| 96 | 24.78 | −20.28 | 10.67 | 26.14 | −18.20 | 11.50 | 2.62 | 25.83 | −18.15 | 12.42 | 2.95 |
| 97 | 19.87 | −17.69 | 1.36 | 20.96 | −13.31 | 2.93 | 4.78 | 20.71 | −13.05 | 3.23 | 5.07 |
| 98 | 34.47 | −1.78 | 0.06 | 33.29 | −1.45 | 0.53 | 1.31 | 33.10 | −1.85 | 0.77 | 1.54 |
| 99 | 66.95 | −11.78 | 0.9 | 67.00 | −11.22 | 0.70 | 0.59 | 67.06 | −11.41 | 1.24 | 0.52 |
| 100 | 84.68 | −14.11 | 0.5 | 85.61 | −13.50 | 1.06 | 1.25 | 85.17 | −12.97 | 1.53 | 1.61 |
| 101 | 15.57 | −8.82 | 1.1 | 17.33 | −5.54 | 1.67 | 3.77 | 17.38 | −5.57 | 2.50 | 3.97 |
| 102 | 66.63 | −21.42 | 1.1 | 65.80 | −20.16 | −0.44 | 2.16 | 65.70 | −20.45 | 0.43 | 1.51 |
| 103 | 74.69 | −24.05 | 0.99 | 73.40 | −22.97 | −0.51 | 2.26 | 73.02 | −22.85 | 0.50 | 2.11 |
| 104 | 50.57 | −8.52 | −1.31 | 51.47 | −6.93 | −1.28 | 1.83 | 50.98 | −7.34 | −0.79 | 1.35 |
| 105 | 24.96 | −21.45 | −3.88 | 25.48 | −17.88 | −1.52 | 4.31 | 24.87 | −18.89 | −0.99 | 3.86 |
| 106 | 89.5 | −8 | −0.03 | 89.91 | −7.90 | 0.01 | 0.43 | 89.04 | −7.27 | 0.00 | 0.87 |
| 107 | 78.28 | −6.99 | −1.42 | 78.87 | −6.57 | −1.69 | 0.77 | 78.20 | −6.55 | −0.97 | 0.63 |
| 108 | 76.27 | −9.39 | −2.48 | 76.98 | −8.66 | −1.88 | 1.18 | 76.08 | −8.35 | −1.24 | 1.63 |

TABLE 3-continued

Measuring data of Examples 1 and 2

| Color | Colorimetric data measured with a spectrophotometer ||| Simultaneous measuring and calibration ||| ΔE*$_{ab}$-real | Calibration precedes measuring ||| ΔE*$_{ab}$-sing |
|---|---|---|---|---|---|---|---|---|---|---|---|
| | L*-ref | a*-ref | b*-ref | L*-real | a*-real | b*-real | | L*-sing | a*-sing | b*-sing | |
| 109 | 41.82 | −33.66 | −10.54 | 41.30 | −34.95 | −15.13 | 4.80 | 40.07 | −35.25 | −14.15 | 4.32 |
| 110 | 13.47 | −3.55 | −0.46 | 15.67 | −2.50 | −0.14 | 2.45 | 15.25 | −2.69 | −0.48 | 1.98 |
| 111 | 85.64 | −11.02 | −3.87 | 86.78 | −11.24 | −3.27 | 1.30 | 85.78 | −10.67 | −3.05 | 0.90 |
| 112 | 55.62 | −16.3 | −9.34 | 56.25 | −16.42 | −9.66 | 0.72 | 55.42 | −16.73 | −8.92 | 0.64 |
| 113 | 74.41 | −19.23 | −10.85 | 74.67 | −19.05 | −11.26 | 0.52 | 73.42 | −18.53 | −9.76 | 1.63 |
| 114 | 44.63 | −22.33 | −12.21 | 44.27 | −23.85 | −15.99 | 4.09 | 43.38 | −23.86 | −15.08 | 3.48 |
| 115 | 64.98 | −25.34 | −13.59 | 64.98 | −26.00 | −14.58 | 1.19 | 63.82 | −25.84 | −13.82 | 1.28 |
| 116 | 35.8 | −25.91 | −12.3 | 37.26 | −25.02 | −13.64 | 2.17 | 35.97 | −25.34 | −13.44 | 1.29 |
| 117 | 55.08 | −30.07 | −18.19 | 54.22 | −32.22 | −22.17 | 4.60 | 53.28 | −32.28 | −21.52 | 4.38 |
| 118 | 84.46 | −1.29 | 0.51 | 85.21 | −1.61 | 0.87 | 0.89 | 84.70 | −1.62 | 1.22 | 0.82 |
| 119 | 84.05 | −8.05 | −5.37 | 84.60 | −8.71 | −5.55 | 0.88 | 83.77 | −8.19 | −5.10 | 0.42 |
| 120 | 17.55 | −9.69 | −8.14 | 18.39 | −8.54 | −7.96 | 1.44 | 17.26 | −8.41 | −7.75 | 1.37 |
| 121 | 75.09 | −14.85 | −13.41 | 74.99 | −15.49 | −14.48 | 1.25 | 73.82 | −14.81 | −13.16 | 1.30 |
| 122 | 46.22 | −16.7 | −16.15 | 46.43 | −17.10 | −18.57 | 2.46 | 45.59 | −17.31 | −17.69 | 1.77 |
| 123 | 34.65 | −22.41 | −17.08 | 37.28 | −21.03 | −16.94 | 2.98 | 36.13 | −21.50 | −16.92 | 1.74 |
| 124 | 35.92 | −2.36 | −3.28 | 36.05 | −2.35 | −5.74 | 2.47 | 35.22 | −2.54 | −5.29 | 2.13 |
| 125 | 33.28 | −7.89 | −10.48 | 33.52 | −6.94 | −12.78 | 2.50 | 31.28 | −7.47 | −13.03 | 3.27 |
| 126 | 60.78 | −2.18 | −2.34 | 62.32 | −2.80 | −2.12 | 1.68 | 61.92 | −2.89 | −1.74 | 1.47 |
| 127 | 88.07 | −4.84 | −4.32 | 88.82 | −5.48 | −4.00 | 1.04 | 87.95 | −5.08 | −3.57 | 0.80 |
| 128 | 77.27 | −5.51 | −7.67 | 77.82 | −5.57 | −7.50 | 0.58 | 76.85 | −5.35 | −6.89 | 0.90 |
| 129 | 26.12 | −7.6 | −10.42 | 23.03 | −7.40 | −12.16 | 3.55 | 22.22 | −7.67 | −12.14 | 4.27 |
| 130 | 46.5 | −12.86 | −19.97 | 47.01 | −13.83 | −22.37 | 2.64 | 45.41 | −14.44 | −22.36 | 3.06 |
| 131 | 34.35 | −15.69 | −23.64 | 36.29 | −14.40 | −22.56 | 2.57 | 35.46 | −14.67 | −22.27 | 2.04 |
| 132 | 13.95 | −6.52 | −9.95 | 14.34 | −5.43 | −10.92 | 1.51 | 12.95 | −4.52 | −10.88 | 2.42 |
| 133 | 29.14 | −9.05 | −17.19 | 29.02 | −7.27 | −19.85 | 3.20 | 27.78 | −7.78 | −20.49 | 4.02 |
| 134 | 38.61 | −16.21 | −32.23 | 39.68 | −17.01 | −31.73 | 1.43 | 38.18 | −16.19 | −31.46 | 0.88 |
| 135 | 35.55 | −2.44 | −8.44 | 35.85 | −2.32 | −10.06 | 1.65 | 34.53 | −2.78 | −9.99 | 1.88 |
| 136 | 30.16 | −4.21 | −17.49 | 30.07 | −2.97 | −19.91 | 2.72 | 28.56 | −4.03 | −20.03 | 3.00 |
| 137 | 28.41 | −10.54 | −27.45 | 29.13 | −7.90 | −28.72 | 3.02 | 27.12 | −8.05 | −29.60 | 3.53 |
| 138 | 17.22 | −4.06 | −20.74 | 16.25 | −4.69 | −21.22 | 1.26 | 13.12 | −5.09 | −23.93 | 5.30 |
| 139 | 63.15 | 0.23 | −0.42 | 64.10 | −0.21 | −0.36 | 1.04 | 63.94 | −0.66 | 0.18 | 1.33 |
| 140 | 45.11 | 0.22 | −10.33 | 46.60 | 1.61 | −9.72 | 2.13 | 45.52 | 0.76 | −9.37 | 1.17 |
| 141 | 24.07 | −1.35 | −28.46 | 24.11 | −0.98 | −30.36 | 1.94 | 22.17 | −1.52 | −31.40 | 3.50 |
| 142 | 18.96 | 2.37 | −24.13 | 18.40 | 0.42 | −26.24 | 2.93 | 16.61 | 0.15 | −27.22 | 4.47 |
| 143 | 14.08 | 0.48 | −13.51 | 13.38 | −2.65 | −16.50 | 4.38 | 12.16 | −2.60 | −17.19 | 5.17 |
| 144 | 7.52 | 0.26 | −0.42 | 13.17 | −0.51 | −0.46 | 5.70 | 12.29 | 0.43 | −0.80 | 4.79 |
| 145 | 72.89 | 4.49 | −16.85 | 73.42 | 4.24 | −16.65 | 0.62 | 72.85 | 3.80 | −16.07 | 1.04 |
| 146 | 25.46 | 8.16 | −39.29 | 23.04 | 8.45 | −42.90 | 4.36 | 21.25 | 8.06 | −43.78 | 6.16 |
| 147 | 13.54 | 0.94 | −0.58 | 15.28 | 0.05 | 0.39 | 2.18 | 14.44 | 0.17 | −1.20 | 1.34 |
| 148 | 33.21 | 19.83 | −12.82 | 31.61 | 22.05 | −13.55 | 2.83 | 30.37 | 21.19 | −14.86 | 3.75 |
| 149 | 44.52 | 25.98 | −6.76 | 44.01 | 26.20 | −7.24 | 0.73 | 42.96 | 24.19 | −8.56 | 2.98 |

TABLE 4

Average and median of ΔE$_{ab}$ of Examples 1–6

| | Number of model parameters | Weighing | Calibration beforehand | Simultaneous calibration | Grey balancing | ΔE$_{ab}$ average | ΔE$_{ab}$ median |
|---|---|---|---|---|---|---|---|
| 1 | 4 | Y | — | Y | — | 2.26 | 1.67 |
| 2 | 4 | Y | Y | — | — | 2.23 | 1.61 |
| 3 | 4 | Y | — | Y | Y | 2.21 | 1.60 |
| 4 | 4 | Y | Y | — | Y | 2.15 | 1.56 |
| 5 | 4 | — | — | Y | — | 2.91 | 2.15 |
| 6 | 20 | — | — | Y | — | 2.32 | 1.74 |

TABLE 6

Average and median of ΔE$_{ab}$ of Examples 7–12

| | Number of model parameters | Weighing | Calibration beforehand | Simultaneous calibration | Grey balancing | ΔE$_{ab}$ average | ΔE$_{ab}$ median |
|---|---|---|---|---|---|---|---|
| 7 | 4 | Y | — | Y | — | 2.20 | 2.04 |
| 8 | 4 | Y | Y | — | — | 2.24 | 2.18 |

TABLE 6-continued

Average and median of $\Delta E_{ab}$ of Examples 7–12

| | Number of model parameters | Weighing | Calibration beforehand | Simultaneous calibration | Grey balancing | $\Delta E_{ab}$ average | $\Delta E_{ab}$ median |
|---|---|---|---|---|---|---|---|
| 9 | 4 | Y | — | Y | Y | 2.59 | 2.40 |
| 10 | 4 | Y | Y | — | Y | 2.55 | 2.25 |
| 11 | 4 | — | — | Y | — | 3.12 | 3.22 |
| 12 | 20 | — | — | Y | — | 4.44 | 2.72 |

TABLE 5

Measuring data of Examples 7 and 8

| | Colorimetric data measured with a spectrophotometer | | | Simultaneous measuring and calibration | | | $\Delta E^*_{ab}$- | Calibration precedes measuring | | | $\Delta E^*_{ab}$- |
|---|---|---|---|---|---|---|---|---|---|---|---|
| Color | L*-ref | a*-ref | b*-ref | L*-real | a*-real | b*-real | real | L*-sing | a*-sing | b*-sing | sing |
| 1 | 34.21 | 16.65 | 16.48 | 34.23 | 14.77 | 19.33 | 1.60 | 34.23 | 14.77 | 19.33 | 1.60 |
| 2 | 33.18 | 15.57 | 23.9 | 34.04 | 14.44 | 24.83 | 2.03 | 34.03 | 14.53 | 24.77 | 2.10 |
| 3 | 35.72 | 17.79 | 33.24 | 34.39 | 14.77 | 31.50 | 2.35 | 34.38 | 14.77 | 31.43 | 2.41 |
| 4 | 32.08 | 21.48 | 17.81 | 31.48 | 19.18 | 20.39 | 1.72 | 31.61 | 19.49 | 20.44 | 1.67 |
| 5 | 37.03 | 23.94 | 32.59 | 38.29 | 20.06 | 33.84 | 0.31 | 38.34 | 20.24 | 33.99 | 0.46 |
| 6 | 33.59 | 33.8 | 18.02 | 31.05 | 29.59 | 16.98 | 5.16 | 30.93 | 30.41 | 17.07 | 4.95 |
| 7 | 33.58 | 32.06 | 24.65 | 33.61 | 28.99 | 26.61 | 1.26 | 33.76 | 29.18 | 27.19 | 1.08 |
| 8 | 34.29 | 37.55 | 33.64 | 35.96 | 35.04 | 36.93 | 1.62 | 35.97 | 35.19 | 37.25 | 1.94 |
| 9 | 45.51 | 17.17 | 16.13 | 45.80 | 15.32 | 17.25 | 0.60 | 45.80 | 15.44 | 17.13 | 0.57 |
| 10 | 50.32 | 14.45 | 24.96 | 51.21 | 9.16 | 26.71 | 2.45 | 51.40 | 9.57 | 26.90 | 2.31 |
| 11 | 48.99 | 16.91 | 36.51 | 50.31 | 9.76 | 38.19 | 2.75 | 50.38 | 9.80 | 38.15 | 2.71 |
| 12 | 50.54 | 25.58 | 16.78 | 52.81 | 22.78 | 19.78 | 2.39 | 52.72 | 22.71 | 19.85 | 2.41 |
| 13 | 52.96 | 22.31 | 32.5 | 54.30 | 16.16 | 35.87 | 2.05 | 54.36 | 16.21 | 36.05 | 2.16 |
| 14 | 45.62 | 32.24 | 17.62 | 45.13 | 28.98 | 18.54 | 2.46 | 45.22 | 29.10 | 18.45 | 2.39 |
| 15 | 50.63 | 34.07 | 24.3 | 51.79 | 28.81 | 27.34 | 2.90 | 51.95 | 29.53 | 27.21 | 2.21 |
| 16 | 51.8 | 37.11 | 36.22 | 53.99 | 32.45 | 41.31 | 2.55 | 54.22 | 33.08 | 41.63 | 2.96 |
| 17 | 18.88 | 15.9 | 9.19 | 20.03 | 13.39 | 9.41 | 1.28 | 20.14 | 13.72 | 9.38 | 1.16 |
| 18 | 29.15 | 20.6 | 24.53 | 29.32 | 17.30 | 27.26 | 1.81 | 29.89 | 17.61 | 27.27 | 1.46 |
| 19 | 18.05 | −5.02 | −15.56 | 15.18 | −1.07 | −16.41 | 4.63 | 15.16 | −0.97 | −16.55 | 4.53 |
| 20 | 31.51 | 51.33 | 31.58 | 31.74 | 45.45 | 29.20 | 3.13 | 31.55 | 46.96 | 29.31 | 3.76 |
| 21 | 26.8 | 24.49 | 19.3 | 26.48 | 23.43 | 21.15 | 1.75 | 26.51 | 23.84 | 21.86 | 2.32 |
| 22 | 44.94 | 32.01 | 44.81 | 48.16 | 27.24 | 47.26 | 1.69 | 48.35 | 27.55 | 47.82 | 2.05 |
| 23 | 25.5 | 9.73 | 17.32 | 25.86 | 7.72 | 15.96 | 1.60 | 25.90 | 7.75 | 16.07 | 1.51 |
| 24 | 35.52 | 26.71 | 26.01 | 35.96 | 23.77 | 28.12 | 0.84 | 35.94 | 24.31 | 28.40 | 1.30 |
| 25 | 43.32 | 8.31 | 32.85 | 42.79 | 2.20 | 32.05 | 1.46 | 42.87 | 2.30 | 31.93 | 1.38 |
| 26 | 39.47 | 42.54 | 30.09 | 40.36 | 50.78 | 39.66 | 5.41 | 40.49 | 51.04 | 39.63 | 5.65 |
| 27 | 47.46 | 20.61 | 24.89 | 47.98 | 16.46 | 26.79 | 1.64 | 47.99 | 16.64 | 26.88 | 1.58 |
| 28 | 67.01 | 13.65 | 34.47 | 68.44 | 8.92 | 37.58 | 2.29 | 68.36 | 8.83 | 37.57 | 2.20 |

What is claimed is:

1. Method of determining a color formula for matching a selected color measured with an electronic imaging device, which method comprises the following steps:
   a) an electronic imaging device is calibrated by measuring the color signals of at least two calibration colors, the calorimetric data of each of the calibration colors being known;
   b) at the same time or in a next step the selected color is measured with the aid of the electronic imaging device;
   c) using a mathematical model, parameters are calculated for converting the measured color signals of the calibration colors to the known calorimetric data;
   d) using the mathematical model and the calculated parameters, the color signals of the measured selected color are converted to colorimetric data; and
   e) using a databank, the color formula of which the colorimetric data most closely matches the calculated calorimetric data of the measured selected color is determined.

2. A method according to claim 1, characterised in that the calibration colors are distributed over the entire colorimetric color space.

3. A method according to claim 2, characterised in that the calibration colors are distributed in the vicinity of the selected color.

4. A method according to claim 3, wherein the method is carried out in the car repair industry.

5. A method according to claim 3, wherein additional information is provided during recording of the selected color with the electronic imaging device.

6. A method according to any of claims 1–3, characterised in that the calibration colors in the vicinity of the selected color are given greater weight when calculating the model parameters.

7. A method according to any of claims 1–3, characterised in that the electronic imaging device is a flatbed scanner.

8. A method according to one or more of preceding claims 1–3, characterised in that the electronic imaging device is a digital camera.

9. A method according to one or more of claims 1–3, characterised in that the measurement of the calibration colors and the selected color takes place simultaneously.

10. A method according to any of claims 1–3, characterised in that texture parameters can be calculated from the recording of the selected color and that by using a databank the color formula can be determined of which the texture parameters most closely match the calculated texture parameters of the measured selected color.

11. A method according to claim 10, characterised in that a ruler is provided on the calibration pattern.

12. A method according to claim 11, wherein the method is carried out in the car repair industry.

13. A method according to claim 11, wherein additional information is provided during recording of the selected color with the electronic imaging device.

14. A method according to claim 1, wherein the method is carried out in the car repair industry.

15. A method according to claim 1, wherein additional information is provided during recording of the selected color with the electronic imaging device.

16. A method of determining a texture and/or color formula for matching a selected color and/or texture of a selected material in which
   a) the color of the selected material is measured with a spectrophotometer or a tri-stimulus meter;
   b) the texture of the selected material is measured with an electronic imaging device; and
   c) the measured color and texture data are used to determine, in a databank, the texture and/or color formula of which the calorimetric data and the texture data most closely match those of the selected material.

17. A method according to claim 16, wherein the method is carried out in the car repair industry.

18. A method according to claim 16, wherein additional information is provided during recording of the selected color with the electronic imaging device.

19. A method of determining the color difference of a selected color measured with an electronic imaging device compared to a standard color sample, which method comprises the following steps:
   a) an electronic imaging device is calibrated by measuring the color signals of at least two calibration colors, the calorimetric data of each of the calibration colors being known;
   b) at the same time or in a next step the selected color is measured with the aid of the electronic imaging device;
   c) using a mathematical model, parameters are calculated for converting the measured color signals of the calibration colors to the known colorimetric data;
   d) using the mathematical model and the calculated parameters, the color signals of the measured selected color are converted to calorimetric data; and
   e) the calorimetric data of the selected color are compared to the colorimetric data of a standard color sample.

* * * * *